United States Patent
Beneventi et al.

(10) Patent No.: US 10,418,631 B2
(45) Date of Patent: Sep. 17, 2019

(54) PRINTING OR SPRAY DEPOSITION METHOD FOR PREPARING A SUPPORTED FLEXIBLE ELECTRODE AND MANUFACTURE OF A LITHIUM-ION BATTERY

(71) Applicants: CENTRE NATIONAL DE LA RECHERCHE SCIENTIFIQUE, Paris (FR); INSTITUT POLYTECHNIQUE DE GRENOBLE, Grenoble (FR)

(72) Inventors: Davide Beneventi, Saint Martin D'Heres (FR); Didier Chaussy, Brie et Angonnes (FR); Oussama El Baradai, Grenoble (FR); Lara Jabbour, Grenoble (FR); Roberta Bongiovanni, Turin (IT)

(73) Assignees: INSTITUT POLYTECHNIQUE DE GRENOBLE, Grenoble (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 248 days.

(21) Appl. No.: 14/898,889

(22) PCT Filed: Jun. 23, 2014

(86) PCT No.: PCT/FR2014/051556
§ 371 (c)(1),
(2) Date: Dec. 16, 2015

(87) PCT Pub. No.: WO2014/207358
PCT Pub. Date: Dec. 31, 2014

(65) Prior Publication Data
US 2016/0126554 A1  May 5, 2016

(30) Foreign Application Priority Data

Jun. 24, 2013 (FR) .................................. 13 56009

(51) Int. Cl.
*H01M 4/04* (2006.01)
*H01M 4/13* (2010.01)
(Continued)

(52) U.S. Cl.
CPC ......... *H01M 4/622* (2013.01); *H01M 4/0402* (2013.01); *H01M 4/0435* (2013.01);
(Continued)

(58) Field of Classification Search
None
See application file for complete search history.

(56) References Cited

U.S. PATENT DOCUMENTS

2011/0294004 A1* 12/2011 Armacanqui ....... H01M 2/0235
429/206
2012/0107666 A1  5/2012 Bailey et al.
(Continued)

FOREIGN PATENT DOCUMENTS

EP  0028879      5/1981
EP  0028879 A2 *  5/1981  ............ H01M 4/244
(Continued)

OTHER PUBLICATIONS

LabChem, Zinc Acetate Dihydrate: safety data sheet, Dec. 2013, LabChem, 1-8.*
(Continued)

*Primary Examiner* — Daniel S Gatewood
(74) *Attorney, Agent, or Firm* — IPSILON USA, LLP

(57) ABSTRACT

The present invention relates to a printing or spray deposition method for preparing a supported flexible electrode and to a method for manufacturing a lithium-ion battery.

20 Claims, 8 Drawing Sheets

(51) Int. Cl.
*H01M 4/62* (2006.01)
*H01M 4/139* (2010.01)
*H01M 10/0525* (2010.01)

(52) U.S. Cl.
CPC ............ *H01M 4/13* (2013.01); *H01M 4/139* (2013.01); *H01M 4/62* (2013.01); *H01M 4/625* (2013.01); *H01M 10/0525* (2013.01); *Y02T 10/7011* (2013.01)

(56) References Cited

U.S. PATENT DOCUMENTS

2013/0122364 A1* 5/2013 Kim ...................... H01M 4/131
429/211
2013/0130108 A1* 5/2013 Alarco ................ H01M 4/0404
429/212
2013/0157105 A1 6/2013 Picard et al.

FOREIGN PATENT DOCUMENTS

| | | | | |
|---|---|---|---|---|
| EP | 2760070 | 7/2014 | | |
| EP | 2760070 A1 * | 7/2014 | ............ | H01M 4/625 |
| JP | S5673858 | 6/1981 | | |
| JP | H 1064546 | 3/1998 | | |
| JP | 2010045047 | 2/2010 | | |
| RU | 2398312 | 5/2010 | | |
| RU | 2011148908 | 6/2013 | | |
| WO | WO 03069700 A2 * | 8/2003 | .......... | H01M 2/0257 |
| WO | 2010138176 | 5/2010 | | |
| WO | 2011044310 | 10/2010 | | |
| WO | WO-2013042720 A1 * | 3/2013 | ............ | H01M 4/625 |

OTHER PUBLICATIONS

Search Report dated 2014.
Japanese Office Action dated Jun. 5, 2018.

* cited by examiner (a)

(b)

(c)

PRINTING OR SPRAY DEPOSITION METHOD FOR PREPARING A SUPPORTED FLEXIBLE ELECTRODE AND MANUFACTURE OF A LITHIUM-ION BATTERY

RELATED APPLICATIONS

This application is a National Phase Application of PCT/FR2014/051556, filed on Jun. 23, 2014, which in turn claims the benefit of priority from French Patent Application No. 13 56009 filed on Jun. 24, 2013, the entirety of which are incorporated herein by reference.

BACKGROUND

Field of the Invention

The present invention relates to the field of flexible, rechargeable lithium-ion (Li-ion) batteries. In particular, the present invention relates to a printing or spray deposition method for preparing a supported flexible electrode that does not require the use of a synthetic polymer binder, or of organic solvents, or of plasticizers, and a method for manufacturing a lithium-ion battery comprising at least one such supported flexible electrode, easy to assemble and having good electrochemical performance.

Description of Related Art

Flexible Li-ion batteries can be used, like all conventional Li-ion batteries, in numerous devices that comprise portable equipment, such as notably mobile telephones, computers and light tools, or heavier equipment such as two-wheeled (bicycles, mopeds) or four-wheeled (electric or hybrid motor vehicles) means of transport. In general, flexible batteries may be used in all applications where it is desirable that the battery should be able to deform or bend, for example in order to fill empty spaces in hybrid or electric cars or for supplying flexible electronic devices other than in all the conventional applications of rigid Li-ion batteries.

A conventional lithium-ion (Li-ion) battery comprises at least one negative electrode (anode) and at least one positive electrode (cathode), between which there is a solid electrolyte or a separator impregnated with a liquid electrolyte. The liquid electrolyte consists for example of a lithium salt in solution in a solvent selected to optimize ion transport and dissociation. In particular, in a lithium-ion battery, each of the electrodes generally comprises a current collector (metal substrate), on which a composite is deposited that comprises a material that is active with respect to lithium, a polymer that performs the role of binder (for example a vinylidene fluoride (PVdF) copolymer), an agent conferring electron conductivity (for example carbon black) and a solvent.

During operation of the battery, lithium ions pass from one of the electrodes to the other through the electrolyte. During discharge of the battery, an amount of lithium reacts with the positive electrode active material from the electrolyte, and an equivalent amount is introduced into the electrolyte from the negative electrode active material, the lithium concentration thus remaining constant in the electrolyte. The insertion of lithium into the positive electrode is compensated by supply of electrons from the negative electrode via an external circuit. During charging, these phenomena take place in reverse.

The operation of flexible Li-ion batteries is the same as that described above for conventional Li-ion batteries. However, to obtain a flexible or foldable battery, it is necessary to develop, in addition, electrodes having not only good conductivity, but also in which the layer of active material has strong adhesion to the substrate, which makes it possible to avoid the appearance of cracks, or even detachment of the active material after bending the battery.

Various methods for manufacturing flexible electrodes have been proposed in the literature. In particular, in patent application FR 2 981 206 A1, self-supported anodes with improved flexibility were manufactured by filtration of an aqueous paste obtained by dispersing a mixture of solid particles comprising powdered graphite and refined cellulose fibres in an aqueous phase, on a filter cloth. This method uses environment-friendly raw materials and allows Li-ion batteries to be made that have good electrochemical performance. However, the filtration step requires said mixture of solid particles to represent only 0.02 to 5 wt % of the total weight of the aqueous paste. This step therefore involves the use of large volumes of aqueous phase, making industrialization of said method more complex. Above 5 wt % of mixture of solid particles in the aqueous paste, the filtration step becomes slower, leading to higher production costs. Moreover, according to the results presented, it seems that at least 10% of refined cellulose fibres is necessary to obtain anodes possessing good mechanical properties while maintaining sufficient conductivity.

The manufacture of flexible electrodes of the carbon nanotube (CNT)/$Li_4Ti_5O_{12}$ (LTO) or carbon nanotube (CNT)/$LiCoO_2$ (LCO) type by a coating process has also been proposed [*ACS nano*, 2010, 4, 10, 5843-5848]. The electrodes are obtained:

- by coating an SS (stainless steel) substrate with an aqueous ink comprising CNTs and a dodecylbenzenesulphonate surfactant in order to cover the SS substrate with a film of carbon nanotubes (SS/CNT composite),
- by coating the free surface of said film of carbon nanotubes with a mixture comprising LTO or LCO, Super P carbon and a PVdF polymer binder in NMP (N-methyl-2-pyrrolidone) organic solvent, to obtain the composite (SS/CNT/LTO or SS/CNT/LCO), and
- immersing said SS/CNT/LTO or SS/CNT/LCO composite in deionized water for easy removal of the CNT/LTO (anode) or CNT/LCO (cathode) bilayer from the SS substrate.

Before assembling the electrodes with the separator to form a flat battery, the CNT/LTO and CNT/LCO electrodes are cut to the desired format (FIG. S5, "Supporting information" section). However, this cutting step to obtain variable shapes of batteries causes a considerable loss of material, making the coating process too expensive. Moreover, this method for manufacturing electrodes uses compounds (synthetic polymer binder, organic solvent, surfactants) that are not very environment-friendly. In addition, the substrate used for preparing the bilayer electrodes is removed and is not recycled during battery manufacture, as separator for example. Now, the current trend is, in contrast, to find production techniques that have the least possible impact environmentally and obtain devices/batteries that are easily recyclable. Finally, the layer of carbon nanotubes (CNTs) performs the role of current collector. All the half-cell tests are carried out with the bilayer electrode, i.e. in the presence of a current collector. This makes it possible to obtain electrochemical performance that is greatly improved (specific capacity of 147 mAh/g for CNT/LTO) relative to half-cell tests without the current collector (without CNTs).

Faced with the growing demand for autonomous energy sources for applications requiring the production of lithium-ion accumulators with varied and innovative architectures, methods for printing electrodes, in order to produce electrode patterns on demand, have recently been proposed. In particular, patent application FR 2 965 107 A1 proposes preparation of an aqueous ink for making electrodes by printing, comprising at least one electrode active material and at least one water-soluble or water-dispersible conductive polymer such as the combination PEDOT/PSS (poly(3, 4-ethylenedioxythiophene)/sodium poly(styrene sulphonate)). The ink is deposited by printing on a metallic current collector. However, such a method has the drawback that it uses a very corrosive binder, and the electrochemical performance of the electrodes prepared by printing is not described.

OBJECTS AND SUMMARY

The aim of the present invention is to supply a printing or spray deposition method for preparing supported flexible electrodes as well as a method for manufacturing a lithium-ion battery.

In particular, the present invention aims to overcome the aforementioned drawbacks partly or completely, and supply a method that is economical, quick and easy for manufacturing supported flexible electrodes of variable shapes, that employs raw materials that are inexpensive, recyclable and non-toxic, that can easily be industrialized, that reduces the losses of materials, while allowing the production of flexible lithium batteries that have good electrochemical performance and are easy to assemble.

Therefore the first object of the present invention is a method for preparing a supported flexible electrode comprising at least one electrode active material, at least one binder, and at least one flexible substrate, said method comprising at least the following steps:

i) a step of preparing an electrode ink by dispersing a mixture of solid particles in an aqueous phase, said mixture of solid particles comprising:
  at least one electrode active material, in an amount in the range from about 70 to 99.5 wt % relative to the total weight of the mixture of solid particles,
  at least one binder comprising a lignocellulosic material, in an amount in the range from about 0.5 to 30 wt % relative to the total weight of the mixture of solid particles,
  said mixture of solid particles representing at least about 25 wt % of the total weight of the electrode ink;

ii) a step of transferring the electrode ink obtained above in step i) onto at least a portion of one of the faces of a flexible substrate by a printing or spray deposition technique, said flexible substrate being selected from a cellulosic substrate, a polymer film and a polymer membrane optionally reinforced with cellulose; and iii) a drying step to obtain a supported flexible electrode comprising the flexible substrate and an electrode film deposited on at least a portion of one of the faces of said flexible substrate.

The applicant company thus discovered, surprisingly, a method that is simple, quick, inexpensive and environment-friendly for preparing both thin and flexible electrodes and flexible Li-ion batteries. For this, the electrode binder comprises a lignocellulosic material that makes it possible to immobilize the active material of the electrode while endowing it with excellent mechanical properties. The printing or spray deposition process is rapid, based on a liquid phase such as water, and is free from synthetic polymers or organic solvent or plasticizer. This method can easily be adapted to the industrial scale since it makes it possible to increase the rates of production, reduce the losses of materials and produce varied electrode patterns on demand. Moreover, as is demonstrated in the examples illustrating the present application, the half-cells of cathodes and anodes prepared according to the method of the invention display very good specific charge/discharge capacities and good cyclic performance compared to the results reported in the literature notably when a filtration technique or a coating technique is employed.

According to the invention, the lignocellulosic material may be selected from cellulose fibres, refined cellulose fibres, cellulose microfibrils, cellulose nanofibrils, lignin and derivatives thereof. The cellulose fibres, the refined cellulose fibres, the cellulose microfibrils and the cellulose nanofibrils have smaller and smaller sizes of fibres (from about 2 mm in length for cellulose fibres to about 100 nm in length for cellulose nanofibrils). The smaller the fibres, the greater their specific surface area, thus favouring their interaction with the particles of active material that is included in the composition of the electrode.

According to a preferred embodiment of the invention, the lignocellulosic material is in the form of fibres or fibrous elements with a length strictly below 1 mm. Such fibres may be selected from refined cellulose fibres, cellulose microfibrils, and cellulose nanofibrils.

The fibres preferably have a length less than or equal to 0.5 mm, and more preferably less than or equal to 0.2 mm.

Such fibres can be used for an electrode ink that is completely compatible with the printing or spray deposition technique used in step ii). In fact, the use of fibres with these lengths makes it possible to avoid, in step ii), obstruction of the screen used in screen printing, or obstruction of the cells of the screen rollers supplying the printing unit in flexography, or clogging of the nozzles used in spray deposition.

Cellulose microfibrils are particularly preferred.

According to the invention, "refined cellulose fibres" means fibres having Schopper-Riegler degrees (°SR) ranging from about 30 to 95°SR. This physical characteristic is derived from the paper industry and is used for quantifying the degree of refining of cellulose fibres. Refining is therefore measured in Schopper-Riegler degrees (°SR), which corresponds to a draining index (the more a paste retains water, the more it is refined). The Schopper-Riegler degree of refining is determined by measuring the drainability of the paste by the method described in standard ISO 5267. The Schopper-Riegler test is designed to measure the rate at which water can be extracted from a dilute suspension of paste. It has been demonstrated that the drainability is a function of the surface condition and swelling of the fibres, and that it constitutes an index that is representative of the intensity of the mechanical treatment that the paste has undergone.

The refined cellulose fibres have undergone a mechanical treatment called refining in order to increase their binding potential and reduce their size, thus making them particularly suitable for use in the electrode ink as prepared in step i).

According to a preferred embodiment of the invention, the refined cellulose fibres are obtained by the method of refining described in patent application FR 2 981 206 A1.

According to a preferred embodiment of the invention, the refined cellulose fibres (FBr) have a Schopper-Riegler degree of at least 60°SR, even more preferably at least 80°SR.

In a particular embodiment, the binder comprising a lignocellulosic material preferably represents from about 0.5 to 5 wt %, and even more preferably from about 0.5 to 1.5 wt % relative to the total weight of the mixture of solid particles.

In fact, this small amount of binder makes it possible both to optimize the amount of active material, which must be as high as possible to guarantee an experimental specific capacity close to the theoretical specific capacity of the battery, while guaranteeing its binding effect, and thus its mechanical properties.

The aqueous phase preferably consists of water.

Preferably, a fibre anti-flocculant is incorporated in the aqueous suspension in step i). In addition to preventing flocculation of the cellulose fibres, this anti-flocculant makes it possible to form, in step i), an electrode ink that is homogeneous, stabilized, and has rheological behaviour suitable for the printing or spray deposition technique in step ii). It thus makes it possible to improve the homogeneity and mechanical strength of the dry electrodes, as well as their electron conductivity.

An anti-flocculant suitable for the present invention may be carboxymethylcellulose (CMC), starch, derivatives thereof such as modified starch or mixtures thereof. Carboxymethylcellulose (CMC) is preferred.

When it is used, the fibre anti-flocculant preferably represents from about 0.5 to 5 wt %, and even more preferably from about 0.5 to 2.5 wt % relative to the total weight of the mixture of solid particles in step i).

Thus, according to a preferred embodiment of the method according to the invention, said mixture of solid particles in step i) comprises:
  an electrode active material, in an amount ranging from about 96 to 99 wt % relative to the total weight of the mixture of solid particles,
  a binder comprising a lignocellulosic material, in an amount in the range from about 0.5 to 1.5 wt % relative to the total weight of the mixture of solid particles, and
  a fibre anti-flocculant, in an amount in the range from about 0.5 to 2.5 wt % relative to the total weight of the mixture of solid particles.

This mixture of solid particles is particularly suitable for preparing an anode ink.

The aqueous suspension in step i) may additionally contain at least one agent generating electron conductivity. The agent generating electron conductivity suitable for the present invention is preferably selected from carbon black, carbon SP, acetylene black, carbon fibres and nanofibres, carbon nanotubes, metal particles and fibres and a mixture thereof. Carbon black is preferred.

When it is used, the agent generating electron conductivity generally represents from about 10 to 40 wt %, preferably from about 25 to 35% by weight, relative to the total weight of the mixture of solid particles in step i).

Thus, according to a preferred embodiment, said mixture of solid particles in step i) comprises:
  an electrode active material, in an amount ranging from about 61 to 74 wt % relative to the total weight of the mixture of solid particles,
  a binder comprising a lignocellulosic material, in an amount in the range from about 0.5 to 1.5 wt % relative to the total weight of the mixture of solid particles,
  a fibre anti-flocculant, in an amount in the range from about 0.5 to 2.5 wt % relative to the total weight of the mixture of solid particles and,
  an agent generating electron conductivity, in an amount in the range from about 25 to 35 wt % relative to the total weight of the mixture of solid particles.

This mixture of solid particles is particularly suitable for preparing a cathode ink.

The electrode active material is generally in the form of particles with average size less than about 200 μm, preferably with a size less than about 100 μm and even more preferably with a size less than about 50 μm.

According to a particular, preferred embodiment of the method according to the invention, the concentration by weight of the mixture of solid particles in the electrode ink at the end of step i) varies from about 25 to 50% and more preferably varies from about 28 to 42%.

At the end of step i), the viscosity of the electrode ink obtained, measured using a rotational rheometer sold under the trade name ANTON PAAR MCR 301, is from about 0.01 to 100 Pa·s at a shear rate of 1 $s^{-1}$. The rheological measurement time corresponding to the time for increasing from 1 $s^{-1}$ to 1000 $s^{-1}$ is about 5 minutes.

Unless stated otherwise, all the viscosity values stated in the present application were measured in the conditions indicated above.

In a particular embodiment, the viscosity of the electrode ink obtained at the end of step i) at a shear rate of 1 $s^{-1}$ preferably ranges from 0.1 to 50 Pa·s when the printing technique used is screen printing; it preferably ranges from 0.01 to 10 Pa·s when the printing technique used is flexography; and it preferably ranges from 0.01 to 0.2 Pa·s when the printing technique used is gravure printing.

The electrode ink in step i) preferably does not comprise organic polymers (e.g. PVdF, PVA), and/or organic solvents (e.g. NMP), and/or plasticizers (e.g. carbonates).

The rheological properties of the ink may be adjusted in relation to the concentration by weight of the various compounds in the electrode ink and the degree of refining of the cellulose fibres when the latter are used.

When the flexible substrate in step ii) is a cellulosic substrate, it is preferably selected from paper.

When the flexible substrate in step ii) is a polymer film, said polymer film preferably comprises at least one polymer selected from the polymers based on polyolefins, polyesters, polyamides and mixtures thereof. Examples of polymers based on polyolefins include the polypropylenes.

When the flexible substrate in step ii) is a polymer membrane, said polymer membrane preferably comprises at least one polymer selected from the photocured polyether-based polymers. Examples of photocured polyether-based polymers include polyoxyethylenes, polysiloxanes and perfluoropolyethers.

"Cellulose-reinforced polymer membrane" means a polymer membrane as defined above, comprising 0.5 to 20 wt % of cellulose relative to the total weight of cellulose-reinforced polymer membrane.

All the flexible substrates used in the method according to the invention (cellulosic substrate, polymer film, polymer membrane optionally reinforced with cellulose) are materials that oppose the passage of electrons, while being compatible with the diffusion of ions, notably of lithium ions.

According to a preferred embodiment of the invention, the flexible substrate used in step ii) has a thickness ranging from about 10 to 800 μm and even more preferably from about 10 to 200 μm.

The printing technique according to step ii) of the method according to the invention may be selected from screen printing, flexography and gravure printing. Step ii) of the method according to the invention is preferably carried out by screen printing.

In step ii), transfer of the electrode ink obtained in step i) onto at least a portion of one of the faces of a flexible substrate by a printing or spray deposition technique is preferably carried out in a single pass.

The drying step iii) of the method according to the invention is generally carried out at a temperature in the range from about 50 to 150° C., preferably from about 80 to 120° C. and even more preferably from about 90 to 110° C. This drying step is generally carried out in the air. However, it may also be carried out under vacuum to promote rapid removal of water.

Thus, the method of the invention according to steps i) to iii) makes it possible to obtain a supported flexible electrode comprising a flexible substrate and an electrode film deposited on one of the faces of said flexible substrate.

"Electrode film" means the electrode ink in step i) that has been deposited on at least a portion of one of the faces of the flexible substrate according to step ii) and dried according to step iii).

In a particular embodiment, said electrode film deposited on at least a portion of one of the faces of the flexible substrate has a thickness ranging from about 5 to 450 µm, and more preferably from about 30 to 100 µm.

In a particular embodiment, dispersion of the mixture of solid particles in an aqueous phase in step i) is carried out according to the following substeps:

i-1) the anti-flocculant and the aqueous phase are mixed and dispersed using a mechanical blade dispersing machine, for a time ranging from about 2 to 10 min at a speed ranging from about 450 to 550 rev/min, i-2) the binder comprising a lignocellulosic material is added to the mixture obtained above in step i-1), then the resultant mixture is dispersed for a time ranging from about 5 to 20 min at a speed ranging from about 450 to 550 rev/min, i-3) the electrode active material and optionally the agent generating electron conductivity are added to the mixture obtained above in step i-2), then the resultant mixture is dispersed for a time ranging from about 5 to 20 min at a speed ranging from about 450 to 550 rev/min, i-4) the mixture thus obtained in step i-3) is stirred mechanically using a mechanical blade dispersing machine, for a time ranging from about 10 to 25 min, at a speed ranging from about 2500 to 3500 rev/min.

The rotary speed of the conventional mechanical blade dispersing machine used in steps i-2) and i-3) is preferably reduced to a speed ranging from about 50 to 150 rev/min while adding the binder, the electrode active material and the agent generating electron conductivity if the latter is present.

When an anode active material is used in step i-3), an additional substep of homogenizing the dispersion is preferably inserted between steps i-3) and i-4). In the course of said additional substep, the mixture obtained in step i-3) is homogenized in a three-roller mill for a time ranging from about 5 to 10 minutes.

The method according to the invention may further comprise a step iv) of calendering the supported flexible electrode obtained according to step iii) of the method according to the invention. This step iv) makes it possible to improve the electrochemical properties of said supported flexible electrode, notably in terms of specific capacity.

In a particular embodiment, depending on the electrode densities desired, the linear load of the calenders in the calendering step iv) ranges from 3 to 100 kg/cm, when the calender rollers used are about 180 mm in diameter and about 300 mm wide.

Thus, the method as described above and according to the invention makes it possible to obtain a supported flexible positive or negative electrode comprising at least one electrode active material, optionally at least one agent generating electrical conductivity, optionally a fibre anti-flocculant, at least one binder comprising a lignocellulosic material immobilizing said electrode active material, and at least one flexible substrate selected from paper, a polymer film and a cellulose-reinforced polymer membrane.

In a particular embodiment, the electrode active material used in step i) of the method according to the invention and making it possible to obtain a supported flexible positive electrode may be selected from the cathode material particles compatible with an aqueous medium and with a diameter <200 µm, preferably <100 µm and even more preferably <50 µm. Examples of cathode materials that may be used in the present invention are: $Li_xMn_yO_4$ ($0<x<2$, $0<y<2$ and $x+y=3$), $LiCoO_2$, $LiMPO_4$, (M=Fe, Mn, Co, Ni), $LiAl_xCo_yNi_zO_2$ ($0<x<1$, $0<y<1$, $0<z<1$ and $x+y+z=1$), $LiNi_{(1-y)}Co_yO_2$ ($0 \leq y \leq 1$), etc.

In a particular embodiment, the electrode active material used in step i) of the method according to the invention and making it possible to obtain a supported flexible negative electrode may be selected from the anode material particles compatible with water and with a diameter <200 µm, preferably <100 µm and even more preferably <50 µm. Examples of anode materials are: graphite, hard carbon, soft carbon, metal alloys of the type $Li_yM$ ($1<y<5$ and M=Mn, Sn, Pb, Si, In, Ti) etc.

A second object of the present invention is a method for manufacturing a lithium-ion battery.

According to a first variant, said method leads to a lithium-ion battery comprising:
  a supported flexible positive electrode comprising a flexible substrate S1 and a cathode film F1 deposited on at least a portion of one of the faces of said flexible substrate S1, and
  a supported flexible negative electrode comprising a flexible substrate S2 and an anode film F2 deposited on at least a portion of one of the faces of said flexible substrate S2,
  a gel electrolyte or a liquid electrolyte placed between said electrodes, with said method comprising at least the following steps:
  a) a step of preparing a supported flexible positive electrode according to steps i), ii), iii) and optionally step iv) of the method according to the first object of the invention,
  b) a step of preparing a supported flexible negative electrode according to steps i), ii), iii) and optionally step iv) of the method according to the first object of the invention,
  c) a step of assembling the electrodes as obtained above in steps a) and b), so that said flexible substrates S1 and S2 are placed face to face in said battery, thus forming a separator S1-S2 between the cathode film F1 and the anode film F2, and one or other of the following steps:
  d-1) a step of impregnating the electrodes as assembled above in step c) with the liquid electrolyte, or
  d-2) a step of encapsulating the gel electrolyte in each of the flexible substrates S1 and S2, said encapsulation step taking place before steps a) and b) of preparing the electrodes.

This first variant thus makes it possible to obtain a battery in which the separator consists of the flexible substrates S1 and S2 and thus avoids the use of an additional separator. Moreover, this method only comprises a single assembly step instead of the two assembly steps generally described in the prior art.

According to this first variant of the method for manufacturing a lithium-ion battery as defined above and according to the invention, the flexible substrates S1 and S2 may be identical or different, and are preferably selected from a cellulosic substrate, a polymer film and a polymer membrane optionally reinforced with cellulose.

Step d-1) of impregnation of the electrodes as assembled in step c) with the liquid electrolyte, may be carried out for example when each of said flexible substrates S1 and S2 is selected from a cellulosic substrate and a polymer film.

Step d-2) of encapsulating the gel electrolyte in each of the flexible substrates S1 and S 2, may be carried out for example when each of said flexible substrates S1 and S2 is a polymer membrane optionally reinforced with cellulose.

According to a second variant, said method leads to a lithium-ion battery comprising:
- a supported flexible positive electrode comprising a flexible substrate S1 and a cathode film F1 deposited on at least a portion of one of the faces of said flexible substrate S1, and
- a supported flexible negative electrode comprising said flexible substrate S1 and an anode film F2 deposited on at least a portion of the other face of said flexible substrate S1,
- a gel electrolyte or a liquid electrolyte placed between said electrodes, with said method comprising at least the following steps:
  a) a step of preparing a supported flexible positive electrode according to steps i), ii), iii) and optionally step iv) of the method according to the first object of the invention, so as to obtain a cathode film F1 deposited on at least a portion of one of the faces of said flexible substrate S1,
  b) a step of preparing a supported flexible negative electrode according to steps i), ii), iii) and optionally step iv) of the method according to the first object of the invention, so as to obtain an anode film F2 deposited on at least a portion of the other face of said flexible substrate S1, said flexible substrate S1 thus forming a separator S1 between the cathode film F1 and the anode film F2, and one or other of the following steps:
  d-1) a step of impregnating the electrodes as obtained above in step b) with the liquid electrolyte, or
  d-2) a step of encapsulating the gel electrolyte in the flexible substrate S1, said encapsulation step taking place before steps a) and b) of preparing the electrodes.

Thus, according to this second variant, steps a) and b) are carried out using the same flexible substrate S1. In this case, steps i) to iii) and optionally iv) are carried out firstly with a cathode ink so as to obtain a cathode film F1 on at least a portion of one of the faces of the flexible substrate S1 and secondly with an anode ink so as to obtain an anode film F2 on at least a portion of the other face of said flexible substrate S1.

This second variant thus makes it possible to obtain directly a two-sided battery and eliminate the assembly step c).

According to this second variant of the method for manufacturing a lithium-ion battery as defined above and according to the invention, the flexible substrate S1 is preferably selected from a cellulosic substrate, a polymer film and a polymer membrane optionally reinforced with cellulose.

Step d-1) of impregnating the electrodes as obtained in step c) with the liquid electrolyte may be carried out, for example, when the flexible substrate S1 is selected from a cellulosic substrate and a polymer film.

Step d-2) of encapsulating the gel electrolyte in the flexible substrate S may be carried out for example when said flexible substrate S1 is a polymer membrane optionally reinforced with cellulose.

In the method for manufacturing a lithium-ion battery according to the invention as defined above according to the two variants, said flexible substrates S1 and S2 are able to be used as a separator and must consist of a material compatible with the diffusion of ions, notably of lithium ions, but which opposes the passage of electrons.

In an even more preferred embodiment, the flexible substrates S1 and S2 according to the first variant or the flexible substrate S according to the second variant are made of paper. Thus, the method makes it possible to obtain an "all paper" flexible battery that will be recyclable and environment-friendly.

The liquid electrolyte used in the method for manufacturing a lithium-ion battery according to the invention may consist of a lithium salt in solution in a liquid solvent selected to optimize ion transport and dissociation.

The gel electrolyte used in the method for manufacturing a lithium-ion battery according to the invention may consist of a lithium salt in a liquid solvent gelled by adding a polymer obtained for example from one or more monomers selected from ethylene oxide, propylene oxide, methyl methacrylate, methyl acrylate, acrylonitrile, methacrylonitrile, and vinylidene fluoride, said polymer having a structure of the linear, comb, random, alternating or block type, crosslinked or not.

The lithium salt may be selected for example from $LiPF_6$, $LiAsF_6$, $LiClO_4$, $LiBF_4$, $LiC_4BO_8$, $Li(C_2F_5SO_2)_2N$, $Li[(C_2F_5)_3PF_3]$, $LiCF_3SO_3$, $LiCH_3SO_3$, $LiN(SO_2CF_3)_2$, and $LiN(SO_2F)_2$.

The liquid solvent may comprise one or more aprotic polar compounds selected from linear or cyclic carbonates, linear or cyclic ethers, linear or cyclic esters, linear or cyclic sulphones, sulphamides and nitriles. The solvent preferably consists of at least two carbonates selected from ethylene carbonate, propylene carbonate, dimethyl carbonate, diethyl carbonate and methyl and ethyl carbonate.

Figure 13:
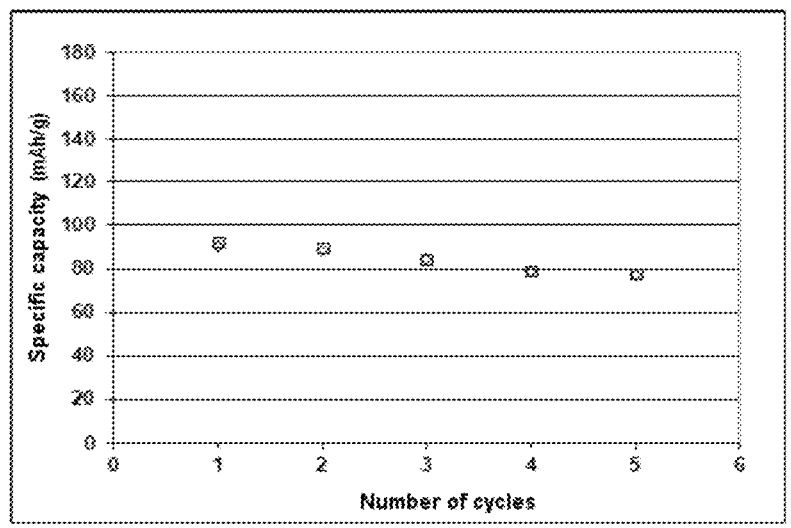
Figure 14:
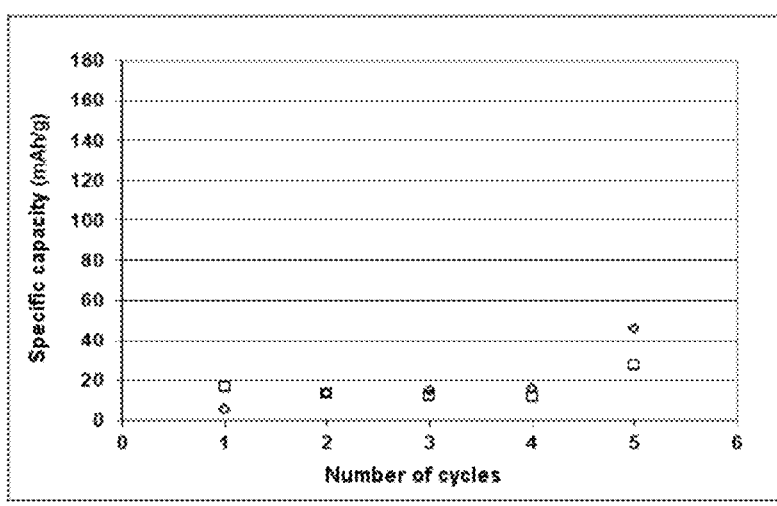

Fig, 12 shows measurements of specific capacities corresponding to C/10, C/5, C/2 and C, in which the specific capacity (in mAh·g$^{-1}$) is a function of the number of cycles, from example 5;

FIG. 13 shows measurements of specific capacity corresponding to C/10, in which the specific capacity (in mAh·g$^{-1}$) is a function of the number of cycles, from example 5; and FIG. 14 shows measurements of specific capacity corresponding to C/10, in which the specific capacity (in mAh·g$^{-1}$) is a function of the number of cycles, from example 5

DETAILED DESCRIPTION

The present invention is illustrated by the examples given hereunder, but is not limited to these.

The raw materials used in the examples are listed below:
Powdered synthetic graphite (GP) having an average particle size of 12 µm and a specific surface area of 9.5 m$^2$/g,
Carboxymethylcellulose (CMC) with weight-average molecular weight of 90 000 g·mol$^{-1}$ and degree of substitution of 0.7.
N-methyl-2-pyrrolidone (NMP) and lithium hexafluorophosphate (LiPF$_6$),
Polyvinylidene fluoride (PVdF),
Ethylene carbonate (EC), propylene carbonate (PC) and dimethyl carbonate (DMC), battery grade
Cellulose microfibrils (MFC) having lengths of fibres from 1 to 10 µm,
Powdered lithium iron phosphate (LiFePO$_4$),
Carbon black (CB),
Paper flexible substrate having a thickness of 140 µm, a porosity of about 45% and permeability to air according to Gurley's method of 2 seconds/10 ml.

All the materials were used as received.

EXAMPLE 1

Preparation of a Negative Electrode (Anode) by Screen Printing, and Characterization Step i) of the method according to the invention was carried out three times according to the following substeps to obtain three identical anode inks:

0.5 g of CMC was dispersed in 36 ml of deionized water using a mechanical blade dispersing machine sold under the name RW 14 by the company IKA®, for 5 min at a speed of 500 rev/min.

The speed of the dispersing machine was then reduced to 100 rev/min and 0.2 g of MFC was added to the dispersing machine. The resultant mixture was left to disperse for 10 min at a speed of 500 rev/min.

The speed of the dispersing machine was then reduced to 100 rev/min and 23 g of GP was added to the dispersing machine. The resultant mixture was left to disperse for 10 min at a speed of 500 rev/min.

Then the mixture obtained was homogenized for 5 minutes using a three-roller mill sold under the trade name EXACT 50i by the company EXACT®.

Finally, said mixture was stirred at a speed of 3000 rev/min for 15 minutes, using a dispersing machine sold under the name CV2-SIP by the company DISPERMAT®.

Each of the anode inks obtained consisted of 1 wt % of MFC, 2 wt % of CMC and 97 wt % of GP. Moreover, the concentration by weight of the mixture of solid particles in the electrode ink at the end of step i) was 40%.

Figure 1:
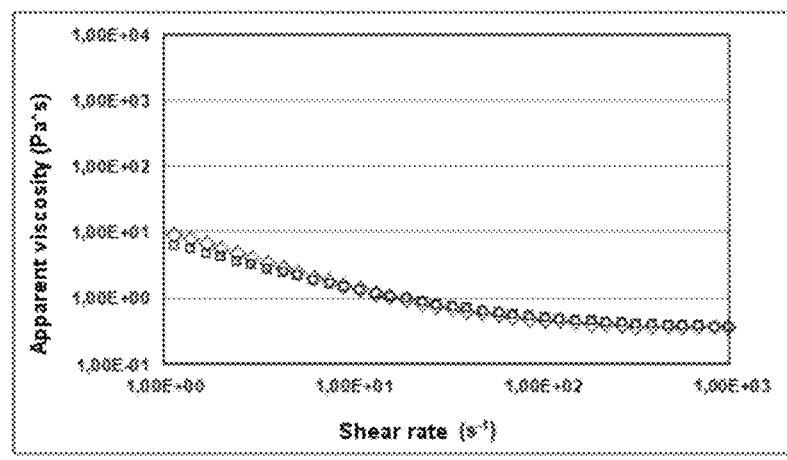
FIG. 1 shows the change in apparent viscosity (in pascal·second, Pa·s) as a function of the shearing rate (in second$^{-1}$, s$^{-1}$) in example 1.

The appended FIG. 1 shows the change in apparent viscosity (in pascal·second, Pa·s) as a function of the shearing rate (in second$^{-1}$, s$^{-1}$). The curve with the empty diamonds reflects the behaviour of the ink at rest and the curve with the empty squares reflects the behaviour of the ink after shearing. FIG. 1 shows absence of a hysteresis cycle between the curve of the ink at rest and the curve of the ink after shearing, which demonstrates the binding effect of MFC and the dispersing effect of CMC.

Figure 2:
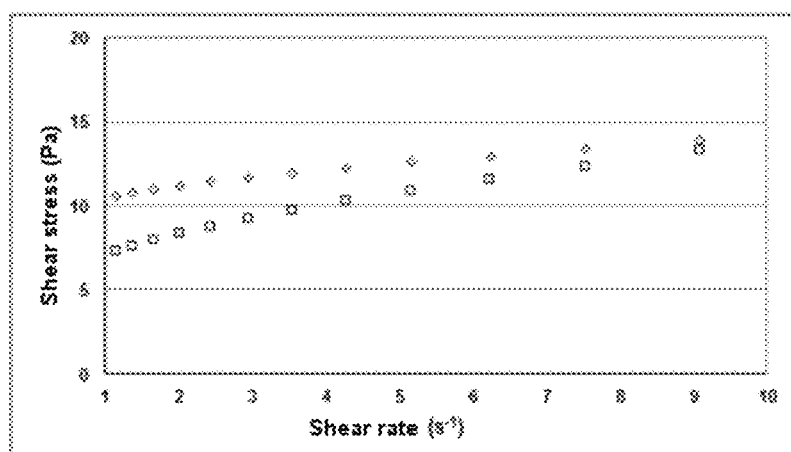
FIG. 2 shows the change in shear stress (in pascal, Pa) as a function of the shearing rate (in second$^{-1}$, s$^{-1}$) in example 1.

The appended FIG. 2 shows the change in shear stress (in pascal, Pa) as a function of the shearing rate (in second$^{-1}$, s$^{-1}$). The curve with the empty diamonds reflects the behaviour of the ink at rest and the curve with the empty squares reflects the behaviour of the ink after shearing.

Based on FIGS. 1 and 2, it can be concluded that the ink obtained has a viscosity at a shear rate of 1 s$^{-1}$ of 10 Pa·s and a threshold shear stress of 9 Pa. An ink having these characteristics may advantageously be deposited on a flexible substrate by a printing technique such as screen printing.

Printing by other printing techniques such as flexography and gravure printing requires electrode inks having lower viscosities at a shear rate of 1 s$^{-1}$, of the order of 0.01 to 10 Pa·s for flexography and 0.01 to 2 Pa·s for gravure printing.

The three identical inks obtained in the step described above were then printed according to step ii) of the method according to the invention.

The printing technique used is screen printing and the flexible substrate used is a paper substrate commonly used in the offset printing industry.

Figure 3:
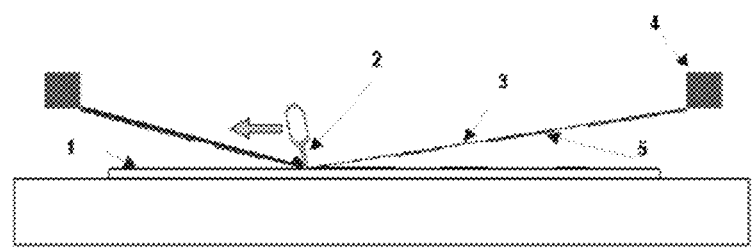
FIG. 3 shows the operating principle of screen printing from example 1.

The appended FIG. 3 shows the operating principle of screen printing. The latter is based on the transfer of ink onto a flexible substrate 1 by pressing a doctor blade 2 on a screen 3 with a fixed mesh opening of 120 µm. A frame 4 comprising stencils 5 is placed on the screen 3, so that ink is only transferred onto a portion of the surface of said flexible substrate 1 according to the desired pattern. According to step ii) of the method according to the invention, an amount of about 5 g of ink was deposited on screen 3, then by adjusting the pressure applied on the doctor blade 2 and the speed of the doctor blade 2, ink was transferred onto the flexible substrate 1.

The screen printing equipment used in the present application is sold under the trade name HORIZON 03I by the company DEK®.

Once printed, the three anodes were dried at 90° C. for 10 minutes in the air.

Once dried, two of the anodes were calendered with a calender, exerting a linear load of 3 kg/cm and 80 kg/cm respectively at room temperature.

The third anode did not undergo a calendering step.

The thickness of each of the anode films deposited on each of the flexible substrates after a single pass in screen printing was measured with a micrometer sold under the trade name M120 by the company ADAMEL LHOMARGY®.

Measurements of electrical conductivity of the anodes obtained were carried out by the four probe method (four probe measurements) using an instrument sold under the trade name JANDEL UNIVERSAL PROBE by the company BRIDGE TECHNOLOGY®.

The porosity of the anodes obtained by the method according to the invention was calculated experimentally from the total volume of the electrode and the respective volumes of each of the compounds present in the electrode. This made it possible to determine the free volume and thus the porosity.

Table 1 below presents the results for thickness of the electrode film deposited on the flexible substrate, conductivity, and porosity of the three supported flexible anodes obtained by the method according to the invention.

TABLE 1

| Anode composition Method used | Thickness of the electrode film (μm) | Conductivity (S/m) | Porosity (%) |
|---|---|---|---|
| GP/CMC/MFC (97/2/1) screen printing/ no calendering | 71 ± 3 | 69 ± 22 | 70 ± 3 |
| GP/CMC/MFC (97/2/1) screen printing/ calendering at 3 kg/cm | 38 ± 1 | 145 ± 53 | 39 ± 2 |
| GP/CMC/MFC (97/2/1) screen printing/ calendering at 80 kg/cm | 33 ± 2 | 619 ± 57 | 37 ± 3 |

The calendering step compresses the electrodes between two slightly compressible rollers. As can be seen from the results in Table 1, this step is reflected in densification of the structure of the electrode, and thus a reduction in the thickness of the electrode film deposited on the flexible substrate and the porosity. This step promotes contact of the graphite particles with one another and thus electron conduction. Accordingly, the results in Table 1 show that the electron conductivity is higher when the pressure exerted during calendering is increased.

A pellet with a diameter of 8 mm was taken from each of the electrodes prepared by the method according to the invention. This pellet was dried under vacuum at 100° C. for 24 hours, in order to remove any traces of water present. Once dried, the electrode pellet was put in a glove box under inert atmosphere for carrying out the electrochemical tests as described below.

Half-cell electrochemical tests, in a cell of the Swagelock® type, were carried out using lithium foil with a diameter of 8 mm as counter-electrode, a solution of lithium hexafluorophosphate (1 mol/l) in EC:PC:DMC (1:1:3, by volume) as electrolyte, a 1 cm dia. pellet of a microporous polymer membrane with a thickness of 25 μm, sold under the trade name CELGARD® 2500 as separator, and the pellet as obtained above as anode.

The cell of the Swagelock® type underwent charge (C)-discharge (D) cycles in different regimes between 0.02 V and 1.2 V: 5 cycles with C/10-D/10, 10 cycles with C/5-D/5, 10 cycles with C/2-D/2 and 20 cycles with C-D.

Figure 4:
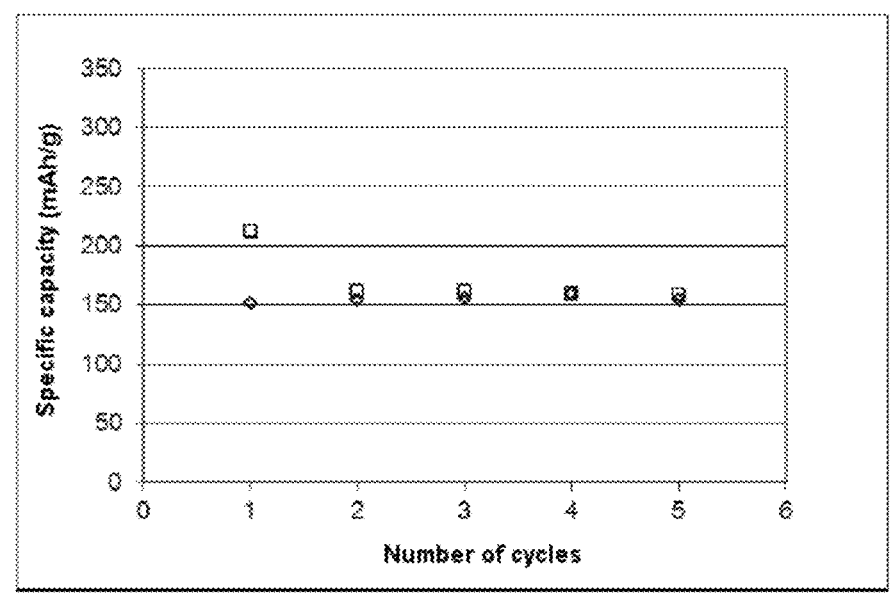
FIGS. 4 and 5 show the measurements of specific capacity for the anodes calendered at 3 kg/cm and 80 kg/cm respectively, where the specific capacity (in mAh·g$^{-1}$) is a function of the number of cycles with a C/10 current regime from example 1.
Figure 5:
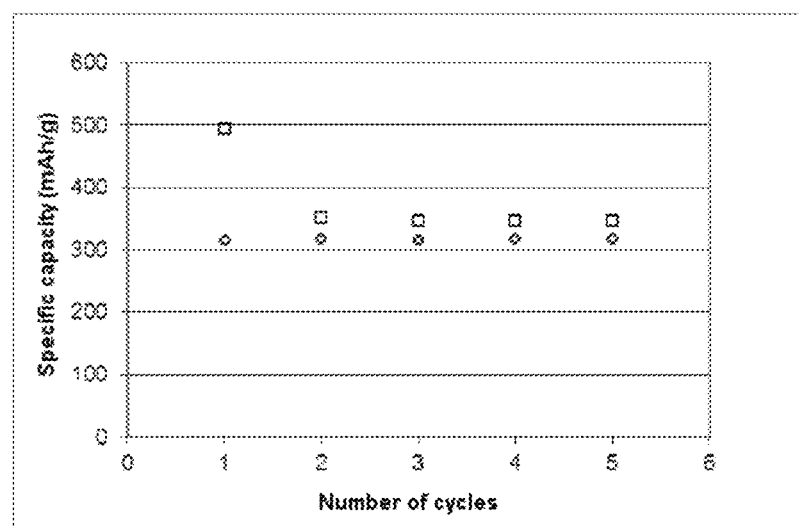

The measurements of specific capacity for the anodes calendered at 3 kg/cm and 80 kg/cm are reported in the appended FIGS. 4 and 5 respectively, where the specific capacity (in mAh·g$^{-1}$) is a function of the number of cycles with a C/10 current regime. In these figures, the curves with the empty diamonds correspond to the measurements taken during charging and the curves with the empty squares correspond to the measurements taken during discharge, the calculation being performed relative to the weight of electrode active material (GP). According to FIG. 4, the graphite anode calendered at a linear load of 3 kg/cm has a specific capacity of about 150 mAh/g. According to FIG. 5, the graphite anode calendered at a linear load of 80 kg/cm has a specific capacity of about 315 mAh/g. This last-mentioned value is very close to the theoretical value of 350 mAh/g. Moreover, when calendering is carried out at 80 kg/cm, the specific capacity is little affected by the charge/discharge current. As for the cycling resistance, it is at least 100 cycles with C/5 and D/5.

Thus, when the calendering step is carried out at a high pressure, the electrochemical properties of the supported anode obtained by the method according to the invention are definitely improved.

EXAMPLE 2

Preparation of Negative Electrodes (Anodes) by Different Printing Techniques 2-1) Preparation by Gravure Printing The anode ink was prepared by the method described in example 1 (step i) of the method according to the invention.

The ink obtained consisted of 1 wt % of MFC, 2 wt % of CMC and 97 wt % of GP. The concentration by weight of the mixture of solid particles in the electrode ink at the end of step i) was 29%.

The ink obtained was then printed according to step ii) of the method according to the invention.

The ink was applied by gravure printing on a flexible substrate identical to that used in example 1.

Figure 6:
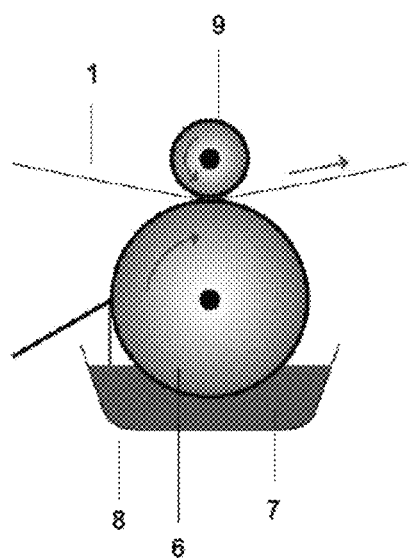
FIG. 6 shows the operating principle of gravure printing from example 2.

The appended FIG. 6 shows the operating principle of gravure printing. With this technique, the printing pattern is etched directly on the surface of a screen roller 6 consisting of cells (the roller is also known as an anilox roll). Said screen roller 6 is brought directly into contact with the ink 7 that is in a tank 8. Once inked, the screen roller 6 is brought directly into contact with the printing substrate 1 (flexible substrate), an impression cylinder 9 allowing suitable pressure to be exerted for transferring the ink 7.

This type of printing technique is particularly suitable when we wish to manufacture electrodes in large quantities (high rate, good ink transfer). However, it requires a smooth printing substrate.

The gravure printing equipment used in the present application is sold under the trade name FLEXIPROOF 100 by the company ERICHSEN®. The screen roller used is characterized by a theoretical volume of 50 cm$^3$/m$^2$. The printing speed was fixed at 25 m/min and the number of successive printings (number of passes) was fixed at 4 in order to obtain sufficient and homogeneous deposition.

Once printed, the electrode was dried at 90° C. for 10 minutes in the air.

2-2) Preparation by Flexography

The anode ink was prepared by the method described in example 1 (step i) of the method according to the invention.

The ink obtained consisted of 1 wt % of MFC, 2 wt % of CMC and 97 wt % of GP. The concentration by weight of the mixture of solid particles in the electrode ink at the end of step i) was 29% as in the gravure printing process described above.

The ink obtained was then printed according to step ii) of the method according to the invention by flexography, on a flexible substrate identical to that used in example 1.

Figure 7:
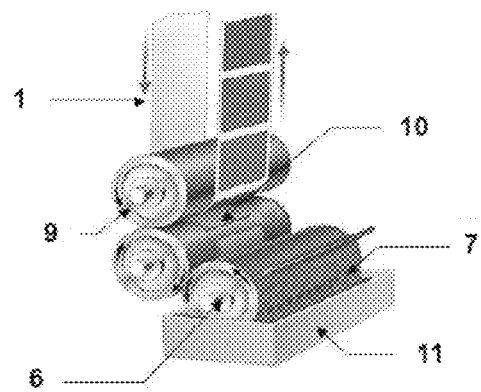
FIG. 7 shows the operating principle of flexography from example 2.

The appended FIG. 7 shows the operating principle of flexography. This method is similar to a rotary tampography system. The ink 7 is deposited on the reliefs of a compressible plate 10 (pad) by means of a screen roller 6 consisting of cells of suitable size for the type of printing required (roller also known as an anilox roll), said screen roller being brought directly into contact with the ink 7 that is in a doctor blade chamber 11. The reliefs on the plate represent the desired print forme. Once inked, the plate 10 is then brought into contact with a printing substrate 1 (flexible substrate) by means of an impression cylinder 9.

This method has great flexibility of use because the compressible plate is able to adapt to very different printing substrates (corrugated cardboard, plastic film, etc.).

The flexography equipment used in the present application is sold under the trade name FLEXIPROOF 100 by the company ERICHSEN®. The screen roller used is characterized by a theoretical volume of 50 $cm^3/m^2$. The printing speed was fixed at 25 m/min and the number of successive printings (number of passes) was fixed at 4 in order to obtain sufficient and homogeneous deposition.

Once printed, the electrode was dried at 90° C. for 10 minutes in the air.

2-3) Preparation by Spray Deposition

The anode ink was prepared by the method described in example 1 (step i) of the method according to the invention.

The ink obtained consisted of 4 wt % of MFC, and 96 wt % of GP. The concentration by weight of the mixture of solid particles in the electrode ink at the end of step i) was 25%.

The ink obtained was then deposited by spraying according to step ii) of the method according to the invention, on a flexible substrate identical to that used in example 1.

Figure 8:
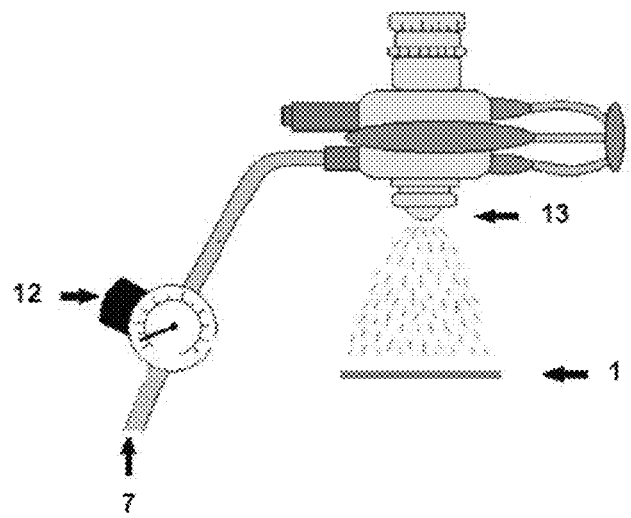
FIG. 8 shows the operating principle of the spray deposition technique from example 2.

The appended FIG. 8 shows the operating principle of the spray deposition technique. The system used consists of a high-pressure pump 12 operating between 150 and 200 bar for conveying the ink 7 to the nozzle 13. The nozzle 13 has an elliptical section with a passage surface area of about 0.30 $mm^2$. The ink 7 is dispersed in the form of fine droplets and projected onto the flexible substrate 1 placed at about 30 to 40 cm from the nozzle 13.

The spray deposition equipment used in the present application is sold under the trade name PROJECT PRO 119 by the company WAGNER®.

The number of successive sprayings (number of passes) was fixed at 8 in order to obtain sufficient and homogeneous deposition.

Once printed, the electrode was dried at 90° C. for 10 minutes in the air.

2-4) Characterization

Table 2 below presents the results for thickness of the electrode film deposited on the flexible substrate, conductivity, and porosity of the three supported flexible anodes obtained by the method according to the invention.

TABLE 2

| Anode composition Method used | Thickness of the electrode film (μm) | Conductivity (S/m) | Porosity (%) |
|---|---|---|---|
| GP/CMC/MFC (97/2/1) gravure printing | 26 ± 1 | 143 ± 48 | 64 ± 5 |
| GP/CMC/MFC (97/2/1) flexography | 10 ± 3 | 76 ± 25 | 72 ± 2 |
| GP/MFC (96/4) Spray deposition | 400 ± 1 | 244 ± 4 | 48 ± 4 |

The results presented in Table 2 show that gravure printing makes it possible to deposit a larger amount of ink relative to flexography (26 μm instead of 10 μm) for one and the same number of passes (4). In fact, gravure printing allows direct transfer of the ink from the anilox roll onto the flexible substrate without using a printing plate. It will be possible, however, to reach larger thicknesses deposited by flexography by increasing the number of passes.

Furthermore, the electrode printed by gravure printing displays higher electron conductivity than the electrode printed by flexography (143 S/m against 76 S/m), comparable to that obtained with an electrode printed by screen printing after undergoing calendering at 3 kg/cm (145 S/m).

As for spray deposition, it is of much greater thickness (400 μm) even if the number of passes is doubled relative to gravure printing and flexography. The spray-printed electrode displays high electron conductivity (244 S/m), improved relative to that obtained with an electrode printed by screen printing after undergoing calendering at 3 kg/cm (145 S/m) or an electrode printed by gravure printing (145 S/m).

A calendering step as described in example 1 may be envisaged for improving the results obtained above by flexography and/or by gravure printing and/or by spray deposition.

In terms of production costs, screen printing is more suitable for one-off printing and for producing electrodes in small quantities, electrode sheet by electrode sheet, as the rate is not so high as in flexography or gravure printing.

Flexography is preferred for intermediate print runs since it allows a high production rate and the plate (pad) can be changed easily.

Gravure printing is more suitable for long production runs of electrodes and in large quantities since etching of the screen roller is expensive and requires some writing-down of the production cost over time.

Spray deposition will be preferred for non-selective deposits on large areas.

Moreover, half-cell electrochemical tests, in a cell of the Swagelock® type, with the same configuration as described in example 1, were carried out with the anodes as prepared above.

Figure 9:
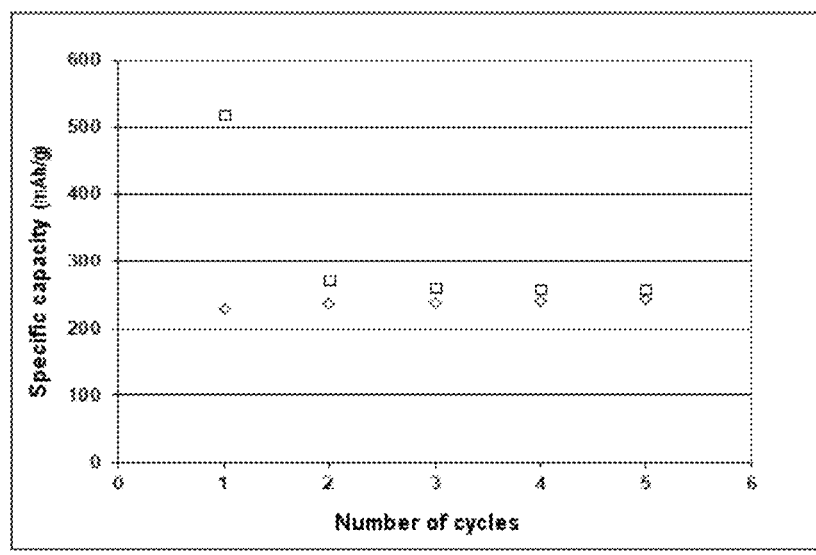
FIGS. 9a-9c show measurements of specific capacities corresponding to C/10, which show the specific capacity (in mAh·g$^{-1}$) as a function of the number of cycles for the electrode printed by gravure printing, the electrode printed by flexography and the electrode obtained by spray deposition respectively, from example 2.
Figure 9:
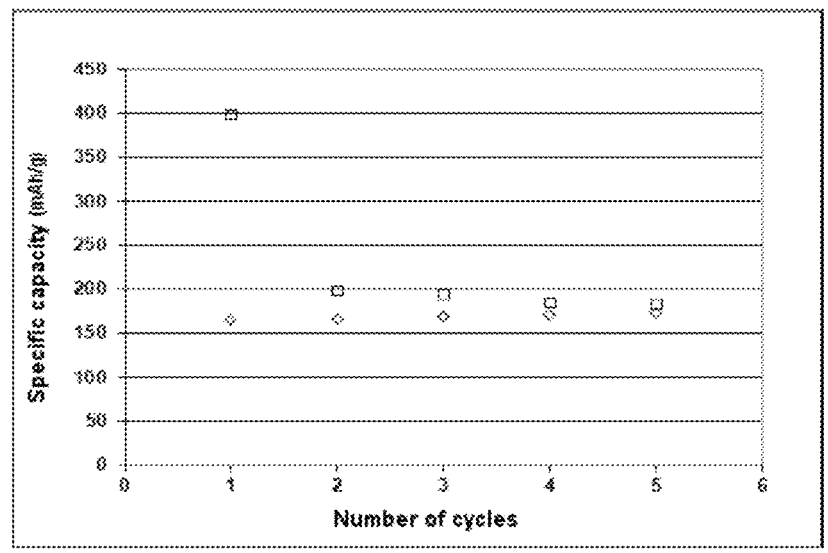
Figure 9:
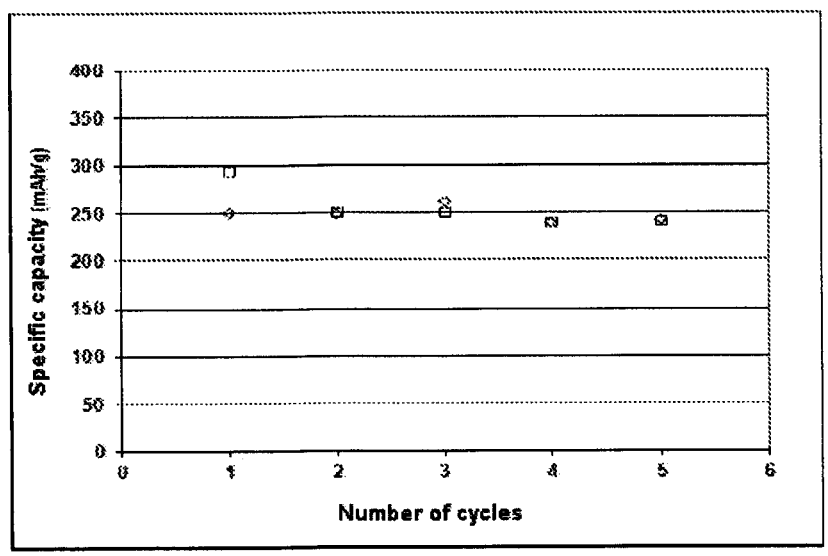

Measurements of specific capacities corresponding to C/10 are reported in the appended FIGS. 9a, 9b and 9c respectively, which show the specific capacity (in $mAh·g^{-1}$) as a function of the number of cycles for the electrode printed by gravure printing, the electrode printed by flexography and the electrode obtained by spray deposition. In these figures, the curves with the empty diamonds correspond to the measurements taken during charging and the curves with the empty squares correspond to the measurements taken during discharge, the calculation being performed relative to the weight of electrode active material (GP).

These results show that the anode prepared by the method according to the invention has a specific capacity of about 210 mAh/g when it is printed by gravure printing, of about 150 mAh/g when it is printed by flexography, and of about 250 mAh/g when it is obtained by spray deposition. These values of specific capacities are close to, or even better than the value for specific capacity measured for the anode printed by screen printing and calendered at 3 kg/cm as described in example 1 (150 mAh/g). Moreover, these values can be improved by adding a calendering step as described in example 1.

EXAMPLE 3

Preparation of Positive Electrodes (Cathodes) and Characterization

Step i) of the method according to the invention was carried out according to the following substeps:

0.5 g of CMC was dispersed in 36 ml of deionized water using the mechanical blade dispersing machine described in example 1 for 5 min at a speed of 500 rev/min.

The speed of the dispersing machine was then reduced to 100 rev/min and 0.2 g of MFC was added to the dispersing machine. The resultant mixture was left to disperse for 10 min at a speed of 500 rev/min.

The speed of the dispersing machine was then reduced again to 100 rev/min and 17 g of LFP and 6 g of CB were added to the dispersing machine. The resultant mixture was left to disperse for 10 min at a speed of 500 rev/min.

Finally, said mixture was stirred at a speed of 3000 rev/min for 15 minutes, still using the dispersing machine described in example 1.

The cathode ink obtained consisted of 1 wt % of MFC, 2 wt % of CMC, 70 wt % of LFP and 27 wt % of CB. Moreover, the concentration by weight of the mixture of solid particles in the electrode ink at the end of step i) was 40%.

The ink obtained has a viscosity of 56 Pa·s at a shear rate equal to 1 $s^{-1}$ and a threshold shear stress of 46 Pa. An ink having these characteristics may advantageously be deposited on a flexible substrate by a printing technique such as screen printing.

The ink obtained in the step described above was then printed according to step ii) of the method according to the invention by screen printing, on a flexible substrate identical to that used in example 1.

Once printed, the electrode was dried at 90° C. for 10 minutes in the air.

Measurements of thickness of the electrode film deposited on the flexible substrate after a single pass in screen printing, electrical conductivity, and porosity of the cathodes were carried out as described in example 1 and are presented in Table 3 below:

TABLE 3

| Cathode composition Method used | Thickness of the electrode film (μm) | Conductivity (S/m) | Porosity (%) |
|---|---|---|---|
| LFP/CB/CMC/MFC (70/27/2/1) screen printing/ no calendering | 35 ± 3 | 35 ± 2 | 68 ± 3 |

Moreover, half-cell electrochemical tests, in a cell of the Swagelock® type, with the same configuration as described in example 1 (except with regard to the charge (C)-discharge (D) cycles, which were carried out between 2.1 V and 4 V), were carried out with the cathode prepared above.

Figure 10:
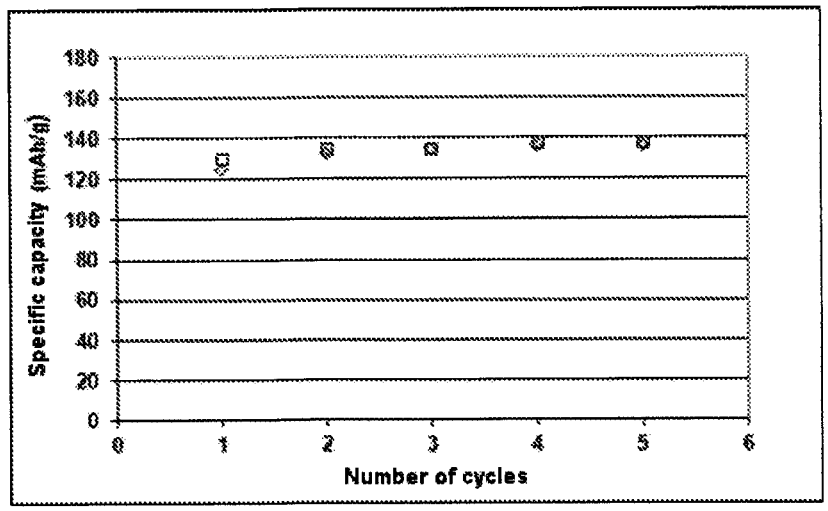
FIG. 10 shows measurements of specific capacity corresponding to C/10, in which the specific capacity (in mAh·g$^{-1}$) is a function of the number of cycles, from example 3.

The measurements of specific capacity corresponding to C/10 are reported in the appended FIG. 10, in which the specific capacity (in mAh·$g^{-1}$) is a function of the number of cycles. In this figure, the curve with the empty diamonds corresponds to the measurements taken during charging and the curve with the empty squares corresponds to the measurements taken during discharging, the calculation being performed relative to the weight of electrode active material (LFP).

These results show that the cathodes prepared according to the procedure mentioned above have a specific capacity of about 140 mAh/g (relative to the weight of active material LFP), this specific capacity being close to the theoretical specific capacity of LFP, which is 170 mAh/g.

Figure 11:
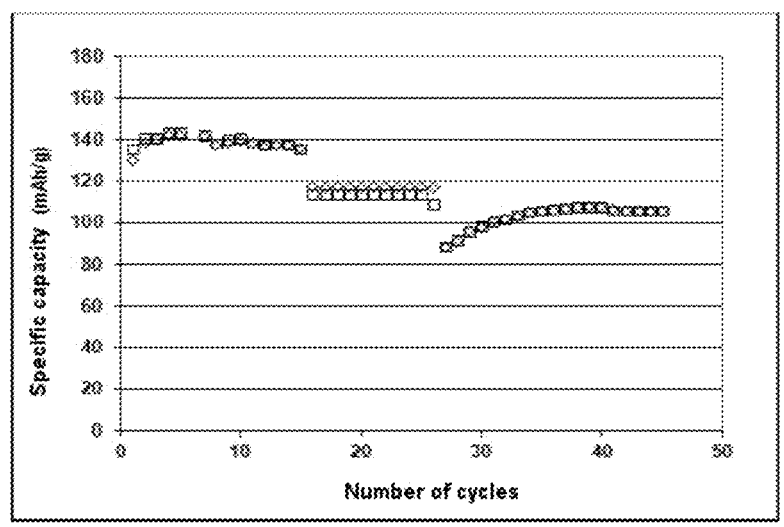
FIG. 11 shows the measurements of specific capacity corresponding to (C/10, C/5, C/2 and C, in which the specific capacity (in mAh·g$^{-1}$) is a function of the number of cycles, from example.

Moreover, the measurements of specific capacity corresponding to C/10, C/5, C/2 and C are reported in the appended FIG. 11, in which the specific capacity (in mAh·$g^{-1}$) is a function of the number of cycles. In this figure, the curves with the empty diamonds correspond to the measurements taken during charging and the curves with the empty squares correspond to the measurements taken during discharge, the calculation being performed relative to the weight of electrode active material (LFP).

FIG. 11 shows that the specific capacity is little affected by the charge/discharge current.

EXAMPLE 4

Preparation of Positive Electrodes (Cathodes) by Different Printing Techniques 4-1) Preparation by Gravure Printing The cathode ink was prepared by the method described in example 3 (step i) of the method according to the invention.

The cathode ink obtained consisted of 1 wt % of MFC, 2 wt % of CMC, 70 wt % of LFP and 27 wt % of CB. The concentration by weight of the mixture of solid particles in the electrode ink at the end of step i) was 36%.

The ink obtained was then printed according to step ii) of the method according to the invention by gravure printing as described above in example 2, on a flexible substrate identical to that used in example 1.

Once printed, the electrode was dried at 90° C. for 10 minutes in the air.

4-2) Preparation by Flexography

The cathode ink was prepared by the method described in example 3 (step i) of the method according to the invention.

The cathode ink obtained consisted of 1 wt % of MFC, 2 wt % of CMC, 70 wt % of LFP and 27 wt % of CB. The concentration by weight of the mixture of solid particles in the electrode ink at the end of step i) was 30%.

The ink obtained was then printed according to step ii) of the method according to the invention by flexography as described above in example 2, on a flexible substrate identical to that used in example 1.

Once printed, the electrode was dried at 90° C. for 10 minutes in the air.

4-3) Characterization

Table 4 below presents the results of measurements of thickness of the electrode film deposited on the flexible substrate, conductivity, and porosity of the two supported flexible cathodes obtained by the method according to the invention.

TABLE 4

| Cathode composition Method used | Thickness of the electrode film (μm) | Conductivity (S/m) | Porosity (%) |
|---|---|---|---|
| LFP/CB/CMC/MFC (70/27/2/1) gravure printing | 19 ± 2 | 25 ± 3 | 65 ± 4 |
| LFP/CB/CMC/MFC (70/27/2/1) flexography | 11 ± 1 | 12 ± 1 | 52 ± 2 |

As was observed during preparation of the anodes, the values of the thicknesses of the cathode film deposited on the flexible substrate show that printing by gravure printing makes it possible to deposit a larger amount of ink relative to printing by flexography. Moreover, the cathode obtained by gravure printing has higher electron conductivity than when it is obtained by flexography. This may be explained by the fact that in the case of gravure printing, the deposit is greater and thus allows better coverage of all the roughness of the printing substrate. Increasing the number of successive printings (number of passes) by flexography might allow the electron conductivity of the cathode to be improved.

A calendering step as described in example 1 may also be envisaged for improving the results obtained.

EXAMPLE 5

Manufacture of a So-called Two-sided Lithium-ion Battery Comprising a Positive Electrode and a Negative Electrode Prepared by Screen Printing 5-1) Preparation of a Supported Flexible Negative Electrode According to Step a) of the Method According to the Second Object of the Invention An anode ink was prepared by the method described in example 1 (step i) of the method according to the first object of the invention.

The anode ink obtained then consisted of 1 wt % of MFC, 2 wt % of CMC and 97 wt % of GP. Moreover, the concentration by weight of the mixture of solid particles in the electrode ink at the end of step i) was 40%.

The anode ink was then printed by screen printing on one of the faces of a flexible substrate S1 identical to that used in example 1, to obtain an anode film F1 deposited on one of the faces of said flexible substrate S1 (step ii) of the method according to the first object of the invention.

Once printed, the electrode (F1-S1) was dried at 90° C. for 10 minutes in the air (step iii) of the method according to the first object of the invention.

5-2) Preparation of a Supported Flexible Positive Electrode According to Step b) of the Method According to the Second Object of the Invention A cathode ink was prepared by the method described in example 3 (step i) of the method according to the first object of the invention.

The cathode ink obtained consisted of 1 wt % of MFC, 2 wt % of CMC, 70 wt % of LFP and 27 wt % of CB. The concentration by weight of the mixture of solid particles in the electrode ink at the end of step i) was 40%.

The cathode ink was then printed by screen printing on the other face of the flexible substrate S1, to obtain a cathode film F2 deposited on the other face of said flexible substrate S1 (step ii) of the method according to the first object of the invention.

Once printed, the assembly (F1-S1-F2) comprising the positive and negative electrodes was dried at 90° C. for 10 minutes in the air.

5-3) Impregnation of the Electrodes According to Step d-1) of the Method According to the Second Object of the Invention The electrodes were impregnated with a solution of lithium hexafluorophosphate (1 mol/l) in EC:PC:DMC (1:1:3, by volume) as liquid electrolyte.

Two-sided printing is quick and makes it possible to avoid the step of assembling the electrodes.

5-4) Characterization

The anode film F1 had a thickness of about 34 μm, and the cathode film F2 had a thickness of about 89 μm.

A pellet with a diameter of 8 mm was taken from the assembly F1-S1-F2 and was dried under vacuum at 100° C. for 24 hours, in order to remove any traces of water present.

Full-battery electrochemical tests, in a cell of the Swagelock® type, were carried out using the pellet as obtained above, impregnated with a solution of lithium hexafluorophosphate (1 mol/l) in EC:PC:DMC (1:1:3, by volume) as liquid electrolyte.

Figure 12:
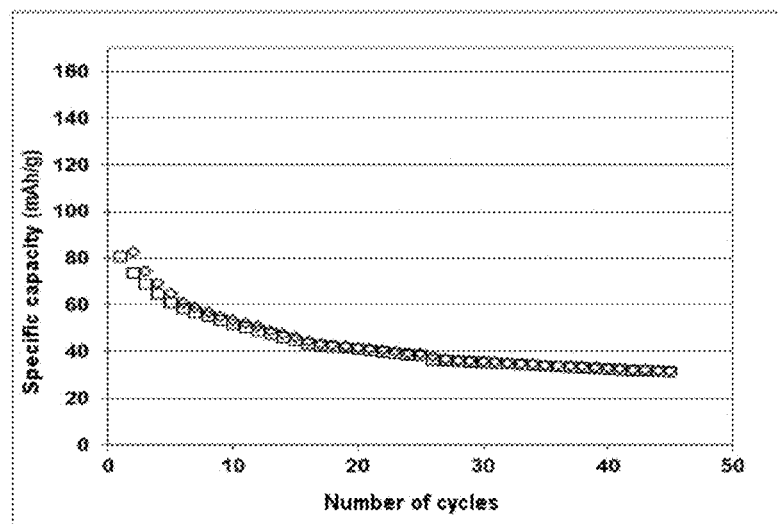

The measurements of specific capacities corresponding to C/10, C/5, C/2 and C are reported in the appended FIG. 12, in which the specific capacity (in mAh·g$^{-1}$) is a function of the number of cycles. In this figure, the curves with the empty diamonds correspond to the measurements taken during charging and the curves with the empty squares correspond to the measurements taken during discharge, the calculation being performed relative to the weight of positive electrode active material (LFP).

FIG. 12 shows that the battery prepared by the method according to the second object of the invention is functional, and is capable of undergoing charging and discharging cycles at low current ratio (C/10) and at higher current ratio (C). The specific capacity measured relative to the weight of active material LFP has a value of about 80 mAh/g, which can easily be improved notably by adding a calendering step iv).

Comparative Example 1

An ink intended for producing a cathode not according to the invention was prepared as follows:

3 g of PVdF was dispersed in 18 ml of NMP using the mechanical blade dispersing machine as described in example 1 for 5 min at a speed of 500 rev/min.

The speed of the dispersing machine was then reduced to 100 rev/min and 14 g of LFP and 5 g of CB were added to the dispersing machine. The resultant mixture was then stirred for 10 min at a speed of 500 rev/min and then for 15 minutes at a speed of 3000 rev/min.

The ink obtained consisted of 12 wt % of PVdF, 65 wt % of LFP and 23 wt % of CB. Moreover, the concentration by weight of the mixture of solid particles in the electrode ink was 55%.

The ink obtained had a zero shear viscosity of about 10 Pa·s. An ink having these characteristics may advantageously be deposited on a flexible substrate by a printing technique such as screen printing or by a coating technique.

As the PVdF binder is toxic, the step of screen printing transfer of the cathode ink comprising said PVdF binder onto a flexible substrate requires the presence of a ventilated hood. As the pilot plant for printing by screen printing used in the present application is of preindustrial size, it cannot be placed under a ventilated hood. In order to work in optimum safety conditions, the inventors of the present application therefore simulated said method of printing by screen printing, by means of a small coating machine.

Thus, the ink prepared above was deposited on a flexible substrate identical to that used in examples 1 to 5 by a coating technique, using a film applicator sold under the trade name 360 by the company ERICHSEN®. This equipment can be placed under a ventilated hood and has a central tank (6×2×2 cm) provided with four lateral openings of 30, 60, 90 and 120 μm respectively, for depositing a coating of a given thickness on a substrate. Several milliliters of ink are introduced into the tank, the desired deposition opening being positioned opposite the direction of coating. The film applicator is then moved manually along the coating substrate.

Once coated, the electrode was dried at 90° C. for 10 minutes in the air.

In order to be able to compare the cathode of example 3 prepared by the method according to the invention, with the cathode as prepared above by a method not according to the invention, the same thickness of cathode film was deposited on the flexible substrate (35 μm).

The measurements of thickness of the electrode film deposited on the flexible substrate after a single coating pass, electrical conductivity, and porosity of the cathode were carried out as described in example 1 and are presented in Table 5 below. As a reminder, the values obtained with the cathode of example 3 are presented on the first line of this table.

TABLE 5

| Cathode composition Method used | Thickness of the electrode film (μm) | Conductivity (S/m) | Porosity (%) |
| --- | --- | --- | --- |
| LFP/CB/CMC/MFC (70/27/2/1) screen printing/ no calendering | 35 ± 3 | 35 ± 2 | 68 ± 3 |
| LFP/CB/PVdF (65/23/12) coating/ no calendering (*) | 35 ± 13 | 33 ± 2 | 56 ± 5 |

(*): Comparative electrode, not forming part of the invention

On the basis of Table 5, it can be concluded that to obtain a supported electrode of the same thickness (140+35=175 μm) as the electrode according to the invention with equivalent physicochemical properties in terms of conductivity and porosity, the conventional PVdF binder must be present in the electrode ink in an amount four times greater than the binder/anti-flocculant mixture present in the electrode ink according to the invention.

The inventors of the present application tried to formulate an ink with only 1 to 3% of PVdF binder. However, this ink did not have suitable rheological characteristics for deposition on a flexible substrate by a printing or coating technique.

Moreover, compared to the screen printing technique, the manual coating technique used does not allow the electrode film to be deposited uniformly on the flexible substrate. This introduces larger uncertainties of measurement for the calculated values of thickness of the electrode film, conductivity, and porosity of the electrode.

Moreover, half-cell electrochemical tests, in a cell of the Swagelock® type with the same configuration as described in example 1, were carried out with the comparative cathode prepared above.

The measurements of specific capacity corresponding to C/10 are reported in the appended FIG. 13, in which the specific capacity (in mAh·g$^{-1}$) is a function of the number of cycles. In this figure, the curve with the empty diamonds corresponds to the measurements taken during charging and the curve with the empty squares corresponds to the measurements taken during discharging, the calculation being performed relative to the weight of electrode active material (LFP).

These results show that the cathodes not according to the invention, i.e. prepared by coating according to the procedure mentioned above, have a specific capacity of about 80 mAh/g (relative to the weight of active material LFP), this specific capacity being well below that obtained with the supported electrode obtained by the method according to the invention. Moreover, poorer cycling stability is observed.

COMPARATIVE EXAMPLE 2

In contrast to the printing and coating techniques, the filtration technique described in patent application FR 2 981 206 A1 makes it possible to manufacture self-supporting electrodes, i.e. without a substrate.

A cathode was prepared by the method described in FR 2 981 206 A1 from a mixture of solid particles comprising 10 wt % of MFC, 2 wt % CMC, 68 wt % of LFP and 20 wt % of CB. The concentration by weight of the mixture of solid particles in the aqueous suspension was 2%.

A nylon cloth with a mesh opening of 33 μm was used as the filter cloth. After pressing and drying the aqueous paste, a self-supported flexible cathode was obtained.

In order to be able to compare the supported cathode according to the present invention and prepared according to example 3 with the cathode as prepared above, not forming part of the invention, the two cathodes were prepared with total equivalent thicknesses of about 175 μm in thickness.

The measurements of thickness, electrical conductivity, and porosity of the cathode were carried out as described in example 1 and are presented in Table 6 below. As a reminder, the values obtained with the cathode of example 3 are presented on the first line of this table.

TABLE 6

| Cathode composition Method used | Total thickness of the cathode (μm) | Conductivity (S/m) | Porosity (%) |
| --- | --- | --- | --- |
| LFP/CB/CMC/MFC (70/27/2/1) screen printing/ no calendering | 175 ± 3 | 35 ± 2 | 68 ± 3 |
| LFP/CB/CMC/MFC (68/20/2/10) filtration/no calendering (*) | 164 ± 7 | 11 ± 1 | 65 ± 2 |

(*): Comparative electrode, not forming part of the invention

On the basis of Table 6, it can be concluded that a self-supported electrode obtained by the filtration method of the prior art and having the same thickness as the supported electrode according to the invention requires at least four times more of the binder/anti-flocculant mixture. Moreover, even with large amounts of the binder/anti-flocculant mixture, the physicochemical properties of the cathode are poorer in terms of conductivity.

Moreover, compared to the screen printing technique, the filtration technique is very slow and requires the use of large volumes of water, i.e. a very low concentration by weight of the mixture of solid particles in the aqueous phase (2%), to facilitate filtration.

Half-cell electrochemical tests, in a cell of the Swagelock® type with the same configuration as described in example 1, were carried out with the cathode not according to the invention prepared above.

The measurements of specific capacity corresponding to C/10 are reported in the appended FIG. 14, in which the specific capacity (in mAh·g$^{-1}$) is a function of the number of cycles. In this figure, the curve with the empty diamonds corresponds to the measurements taken during charging and the curve with the empty squares corresponds to the measurements taken during discharging, the calculation being performed relative to the weight of electrode active material (LFP).

These results show that the cathodes not according to the invention, i.e. prepared by filtration, have a specific capacity of about 46 mAh/g (relative to the weight of active material LFP), this specific capacity being far below that obtained with the supported electrode according to the invention. Moreover, a certain cycling instability is observed.

Moreover, FR 2 981 206 A1 uses an additive such as hydrated aluminium sulphate for preparing the cathode. This additive makes it possible to improve the affinity between the binder (lignocellulosic material) and the agent generating electron conductivity (carbon black). The cathode described in FR 2 981 206 A1 comprises 60% of LFP, 24% of CB, 0.6% of CMC, 15% of refined cellulose fibres and 0.4% of hydrated aluminium sulphate. In this case, the specific capacity obtained is improved (specific capacity of 55 mAh/g) and the cycling stability is good. This specific capacity is, however, well below that obtained with the printing technique according to the invention (specific capacity of 140 mAh/g).

Thus, the method according to the invention makes it possible on the one hand to improve the electrochemical performance, and on the other hand this performance is achieved without additives such as hydrated aluminium sulphate.

The results presented in the various examples above show that the printing technique according to the invention makes it possible to obtain a supported flexible electrode possessing high electrochemical performance in terms of specific capacity and cycling stability, and good conductivity. Moreover, said method avoids the use of organic solvents, plasticizers, and conventional polymer binders that are not environment-friendly and it allows:

- the manufacture of electrodes, in a far shorter time of about 3 minutes, whereas the time for manufacture by the filtration method is about 10 minutes per electrode.
- great selectivity in localization of the deposit, which is not conceivable with the coating and filtration techniques,
- production of a multilayer deposit,
- production of a two-sided deposit, so as to avoid the step of assembly of the electrodes and the separator during manufacture of the complete battery, and
- easy disassembly at the end of the electrode's life by redispersion in water.

The invention claimed is:

1. A method for preparing a supported flexible electrode having at least one electrode active material, at least one binder and at least one flexible substrate, said method comprising at least the following steps:
    i) a step of preparing an electrode ink in the form of an aqueous suspension comprising, a mixture of solid particles dispersed in an aqueous phase, said mixture of solid particles comprising:
        at least one electrode active material, in an amount in the range from 70 to 99.5 wt % relative to the total weight of the mixture of solid particles,
        at least one binder comprising a cellulosic material, in an amount in the range from 0.5 to 30 wt % relative to the total weight of the mixture of solid particles, said cellulosic material being selected from refined cellulose fibres, cellulose microfibrils, and cellulose nanofibril, and
        the concentration by weight of said mixture of solid particles in the electrode ink at the end of step i) varying from 25 wt % to 50 wt %, with respect to the total weight of the electrode ink;
    ii) a step of transferring the electrode ink obtained above in step i) onto at least a portion of one of the faces of a flexible substrate by a printing or spray deposition technique, said flexible substrate being selected from the group consisting of a cellulosic substrate, a polymer film and a polymer membrane optionally reinforced with cellulose; and
    iii) a drying step to obtain a supported flexible electrode comprising the substrate and an electrode film deposited on at least a portion of one of the faces of said flexible substrate.

2. The method according to claim 1, wherein the binder comprising a cellulosic material represents from 0.5 to 1.5 wt % relative to the total weight of the mixture of solid particles.

3. The method according to claim 1, wherein a fiber anti-flocculant is incorporated in the aqueous suspension in step i).

4. The method according to claim 3, wherein the fiber anti-flocculant is selected from carboxymethylcellulose (CMC), starch, modified starch and a mixture thereof.

5. The method according to claim 3, wherein the fiber anti-flocculant represents from 0.5 to 2.5 wt % relative to the total weight of the mixture of solid particles.

6. The method according to claim 1, wherein an agent generating electron conductivity is incorporated in the aqueous suspension in step i).

7. The method according to claim 6, wherein the agent generating electron conductivity is selected from the group consisting of carbon black, carbon SP, acetylene black, carbon fiber and nanofibers, carbon nanotubes, metal particles and fibers and a mixture thereof.

8. The method according to claim 6, wherein the agent generating electron conductivity represents from 25 to 35 wt % relative to the total weight of the mixture of solid particles.

9. The method according to claim 1, wherein the concentration by weight of the mixture of solid particles in the electrode ink at the end of step i) varies from 28 to 42%.

10. The method according to claim 1, wherein the printing technique used is selected from the group consisting of screen printing, flexography and gravure printing.

11. The method according to claim 3, wherein dispersion of the mixture of solid particles in an aqueous phase in step i) is carried out according to the following substeps:
    i-1) the fiber anti-flocculant and the aqueous phase are mixed and dispersed using a mechanical blade dispersing machine, for a time ranging from 2 to 10 min at a speed ranging from 450 to 550 rev/min,
    i-2) the binder comprising a cellulosic material is added to the mixture obtained above in step i-1), then the resultant mixture is dispersed for a time ranging from 5 to 20 min at a speed ranging from 450 to 550 rev/min,
    i-3) the electrode active material and optionally the agent generating electron conductivity are added to the mixture obtained above in step i-2), then the resultant mixture is dispersed for a time ranging from 5 to 20 min at a speed ranging from 450 to 550 rev/min,
    i-4) the mixture thus obtained in step i-3) is stirred mechanically using a mechanical blade dispersing machine for a time ranging from 10 to 25 min, at a speed ranging from 2500 to 3500 rev/min.

12. The method according to claim claim 11, wherein when an anode active material is used in step i-3), the mixture obtained in step i-3) is homogenized according to an additional substep in a three-roller mill for a time in the range from 5 to 10 minutes before carrying out step i-4).

13. The method according to claim 1, wherein the electrode film deposited on at least a portion of one of the faces of said substrate has a thickness ranging from 30 to 100 μm.

14. The method according to claim 1, wherein said method further comprises a step iv) of calendering the supported flexible electrode as obtained according to step iii).

15. The method according to claim 1, wherein the electrode active material used in step i) and making it possible to obtain a supported flexible positive electrode, is selected from $Li_xMn_yO_4$ ($0<x<2$, $0<y<2$ and $x+y=3$), $LiCoO_2$, $LiMPO_4$, (M =Fe, Mn, Co, Ni), $LiAl_xCo_yNi_zO_2$ ($0<x<1$, $0<y<1$, $0<z<1$ and $x+y+z=1$) and $LiNi_{(1-y)}Co_yO_2$ ($0\leq y\leq 1$).

16. The method according to claim 1, wherein the electrode active material used in step i) and making it possible to obtain a supported flexible negative electrode is selected from: graphite, hard carbon, soft carbon and the metal alloys $Li_yM$ ($1<y<5$ and M =Mn, Sn, Pb, Si, In, Ti).

17. A method for manufacturing a lithium-ion battery comprising:
- a supported flexible positive electrode comprising a flexible substrate S1 and a cathode film F1 deposited on at least a portion of one of the faces of said flexible substrate S1, and
- a supported flexible negative electrode comprising a flexible substrate S2 and an anode film F2 deposited on at least a portion of one of the faces of said flexible substrate S2,
- a gel electrolyte or a liquid electrolyte placed between said electrodes, with said method comprising at least the following steps:
  a) a step of preparing a supported flexible positive electrode according to steps i), ii), iii) of the method as defined according to claim 1,
  b) a step of preparing a supported flexible negative electrode according to steps i), ii), iii) of the method as defined according to claim 1,
  c) a step of assembling the electrodes as obtained above in steps a) and b), so that said flexible substrates S1 and S2 are placed face to face in said battery, thus forming a separator S1-S2 between the cathode film F1 and the anode film F2, and one or other of the following steps:
  d-1) a step of impregnating the electrodes as assembled above in step c) with a liquid electrolyte, or
  d-2) a step of encapsulating the gel electrolyte in each of the flexible substrates S1 and S2, said encapsulation step taking place before steps a) and b) of preparing the electrodes.

18. A method for manufacturing a lithium-ion battery comprising:
- a supported flexible positive electrode comprising a flexible substrate S1 and a cathode film F1 deposited on at least a portion of one of the faces of said flexible substrate S1, and
- a supported flexible negative electrode comprising said flexible substrate S1 and an anode film F2 deposited on at least a portion of the other face of said flexible substrate S1,
- a gel electrolyte or a liquid electrolyte placed between said electrodes, with said method comprising at least the following steps:
  a) a step of preparing a supported flexible positive electrode according to steps i), ii), iii) of the method as defined according to claim 1, so as to obtain a cathode film F1 deposited on at least a portion of one of the faces of said flexible substrate S1,
  b) a step of preparing a supported flexible negative electrode according to steps i), ii), iii) of the method as defined according to claim 1, so as to obtain an anode film F2 deposited on at least a portion of the other face of said flexible substrate S1, said flexible substrate S1 thus forming a separator S1 between the cathode film F1 and the anode film F2, and one or other of the following steps:
  d-1) a step of impregnating the electrodes as obtained above in step b) with a liquid electrolyte, or
  d-2) a step of encapsulating the gel electrolyte in the flexible substrate S1, said encapsulation step taking place before steps a) and b) of preparing the electrodes.

19. Method The method according to claim 1, wherein the cellulosic material is in the form of fibres or fibrous elements with a length strictly below 1 mm.

20. The method according to claim 1, wherein at the end of step i), the viscosity of the electrode ink obtained, measured using a rotational rheometer sold under the trade name ANTON PAAR MCR 301, is from 0.01 to 100 Pa·s at a shear rate of $1\ s^{-1}$.

* * * * *